US012697852B2

(12) United States Patent
Hu et al.

(10) Patent No.: US 12,697,852 B2
(45) Date of Patent: Aug. 4, 2026

(54) MITIGATING AIRLOCK IN COOLING CHANNELS FOR LARGE AREA COOLING SYSTEMS FOR BATTERIES

(71) Applicant: GM GLOBAL TECHNOLOGY OPERATIONS LLC, Detroit, MI (US)

(72) Inventors: Zhenwen Hu, Shanghai (CN); Kristopher A. Thor, Novi, MI (US); Jian Yao, Shanghai (CN); Chengwu Duan, Shanghai (CN); Madhusudan Raghavan, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 18/674,342

(22) Filed: May 24, 2024

(65) Prior Publication Data

US 2025/0340097 A1 Nov. 6, 2025

(30) Foreign Application Priority Data

May 6, 2024 (CN) ......................... 202410550843.2

(51) Int. Cl.
B60H 1/00 (2006.01)

(52) U.S. Cl.
CPC ..... B60H 1/00571 (2013.01); B60H 1/00278 (2013.01)

(58) Field of Classification Search
CPC .... F28D 1/0475; F28D 1/0476; F28D 1/0477; F28D 1/0478; B60H 1/00; B60H 1/00571; B60H 1/00278; H01M 10/6556; H01M 10/613; H01M 10/625; H01M 2220/20
See application file for complete search history.

(56) References Cited

U.S. PATENT DOCUMENTS

| | | | |
|---|---|---|---|
| 4,755,331 A * | 7/1988 | Merrill ...................... | F28D 5/02 165/172 |
| 2009/0090486 A1* | 4/2009 | Geskes ................. | F28D 9/0056 165/172 |
| 2011/0206968 A1 | 8/2011 | Nishimura et al. | |
| 2019/0033002 A1* | 1/2019 | Nakamura ............... | F28F 9/22 |

FOREIGN PATENT DOCUMENTS

| | | | |
|---|---|---|---|
| CN | 202057223 U | * | 11/2011 |
| JP | 2019185902 A | | 10/2019 |

OTHER PUBLICATIONS

German Office Action from counterpart DE1020241162112, dated May 15, 2025.

* cited by examiner

*Primary Examiner* — Harry E Arant

(57) ABSTRACT

A cooling system includes a cooling channel having a nominal width and N longitudinal portions, where N is an integer greater than one. An inlet is connected to an end of a first one of the N longitudinal portions of the cooling channel. An outlet is connected to an end of a last one of the N longitudinal portions of the cooling channel. At least one U turn location connects ends of at least two middle ones of the N longitudinal portions of the cooling channel. The at least one U turn location is tapered.

16 Claims, 3 Drawing Sheets

MITIGATING AIRLOCK IN COOLING CHANNELS FOR LARGE AREA COOLING SYSTEMS FOR BATTERIES

CROSS-REFERENCE TO RELATED APPLICATIONS

This application claims the benefit of Chinese Patent Application No. 202410550843.2, filed on May 6, 2024. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to cooling systems for batteries, and more particularly to cooling channels of cooling systems for battery systems.

Electric vehicles (EVs) such as battery electric vehicles (BEVs), hybrid vehicles, and/or fuel cell vehicles include one or more electric machines and a battery system including one or more battery cells, modules, and/or packs. A power control system is used to control charging and/or discharging of the battery system during charging and/or driving.

During cycling of the battery system, heat may be generated. Maintaining the battery cells below a maximum operating temperature is important for durability and safety of the battery system. Cooling systems may be used to ensure that the battery system operates below the maximum operating temperature of the battery system. However, air pockets can become trapped in cooling channels of the cooling system, which reduces efficiency.

SUMMARY

A cooling system includes a cooling channel having a nominal width and N longitudinal portions, where N is an integer greater than one. An inlet is connected to an end of a first one of the N longitudinal portions of the cooling channel. An outlet is connected to an end of a last one of the N longitudinal portions of the cooling channel. At least one U turn location connects the ends of at least two middle ones of the N longitudinal portions of the cooling channel. The at least one U turn location is tapered.

In other features, the N longitudinal portions of the cooling channel are arranged over one another in a vertical direction. The cooling channel is tapered in a range from 30% to 70 from the nominal width. A bottom side of an upper cooling channel at the at least one U turn location is tapered towards an upper side of the upper cooling channel at the at least one U turn location. A bottom side of a lower cooling channel at the at least one U turn location is tapered towards an upper side of the lower cooling channel at the at least one U turn location.

In other features, B annular baffles arranged in the at least one U turn location, where B is an integer greater than zero. B is greater than one and the B annular baffles are uniformly spaced. B is greater than two and the B annular baffles are spaced by an increasing width.

In other features, a surface treatment film is coated on an inner surface of the at least one U turn location, wherein the surface treatment film is configured to reduce a coolant-wall contact angle. The at least one U turn location comprises a shape memory alloy.

A vehicle includes a battery system and the cooling system in thermal contact with one or more surfaces of the battery system.

A cooling system includes a cooling channel having a nominal width and N longitudinal portions extending longitudinally, where N is an integer greater than one. An inlet is connected to an end of a first one of the N longitudinal portions of the cooling channel. An outlet is connected to an end of a last one of the N longitudinal portions of the cooling channel. At least one U turn location connecting ends of at least two of the N longitudinal portions of the cooling channel. B annular baffles are arranged in the at least one U turn location where B is an integer greater than zero.

In other features, B is greater than one and the B annular baffles are uniformly spaced. B is greater than two and the B annular baffles are spaced by an increasing width. The N longitudinal portions of the cooling channel are arranged over one another in a vertical direction. The at least one U turn location is tapered in a range from 30% to 70 from the nominal width.

In other features, a bottom side of an upper cooling channel at the at least one U turn location is tapered towards an upper side of the upper cooling channel at the at least one U turn location. A bottom side of a lower cooling channel at the at least one U turn location is tapered towards an upper side of the lower cooling channel at the at least one U turn location.

In other features, a surface treatment film is coated on an inner surface of the at least one U turn location, wherein the surface treatment film is configured to reduce a coolant-wall contact angle. The at least one U turn location comprises a shape memory alloy.

A cooling system comprises a cooling channel having a nominal width and including N longitudinal portions, where N is an integer greater than one. An inlet is connected to an end of a first one of the N longitudinal portions of the cooling channel. An outlet is connected to an end of a last one of the N longitudinal portions of the cooling channel. At least one U turn location connects ends of at least two of the N longitudinal portions of the cooling channel. A surface treatment film is coated on an inner surface of the at least one U turn location, wherein the surface treatment film is configured to reduce a coolant-wall contact angle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the present disclosure describes a cooling system for a battery system of an electric vehicle or hybrid vehicle, the cooling channels can be used in cooling systems for stationary applications and/or other applications.

A cooling channel for a cooling system includes a reduced channel width at U-turn locations to increase a local velocity of the cooling fluid and facilitate de-aeration at the U-turn locations, where airlock (e.g., an air pocket that is trapped) is most likely to occur. For example, the channel width is tapered at the U-turn locations to reduce a local pressure drop. In some examples, an upper channel of the U-turn location is tapered along a bottom side to increase upper side velocity to suppress buoyancy. In some examples, a lower channel of the same U-turn location is also tapered along a bottom side to avoid intensifying a low-pressure vortex at upper side, which may trap the air pocket.

In some examples, the cooling channels include arcuate baffles at the U-turn locations. The arcuate baffles divide the nominal channels into narrower subchannels arranged in parallel. The arcuate baffles reduce the maximum air pocket sizes to reduce critical velocity for de-aeration. In some examples, the arcuate baffles are uniformly-spaced. In other examples, the spacing increases or decreases in fixed or variable intervals from inner to outer.

In some examples, a surface treatment film is applied at the U-turn locations to reduce the coolant-wall contact angle, which reduces the frictional force to facilitate de-aeration. In other examples, the U-turn locations of the cooling channels are made with memory alloy to allow the U-turn locations to change shape at different temperatures. For example, the width of the U-turn locations constricts at higher temperatures.

Figure 1:
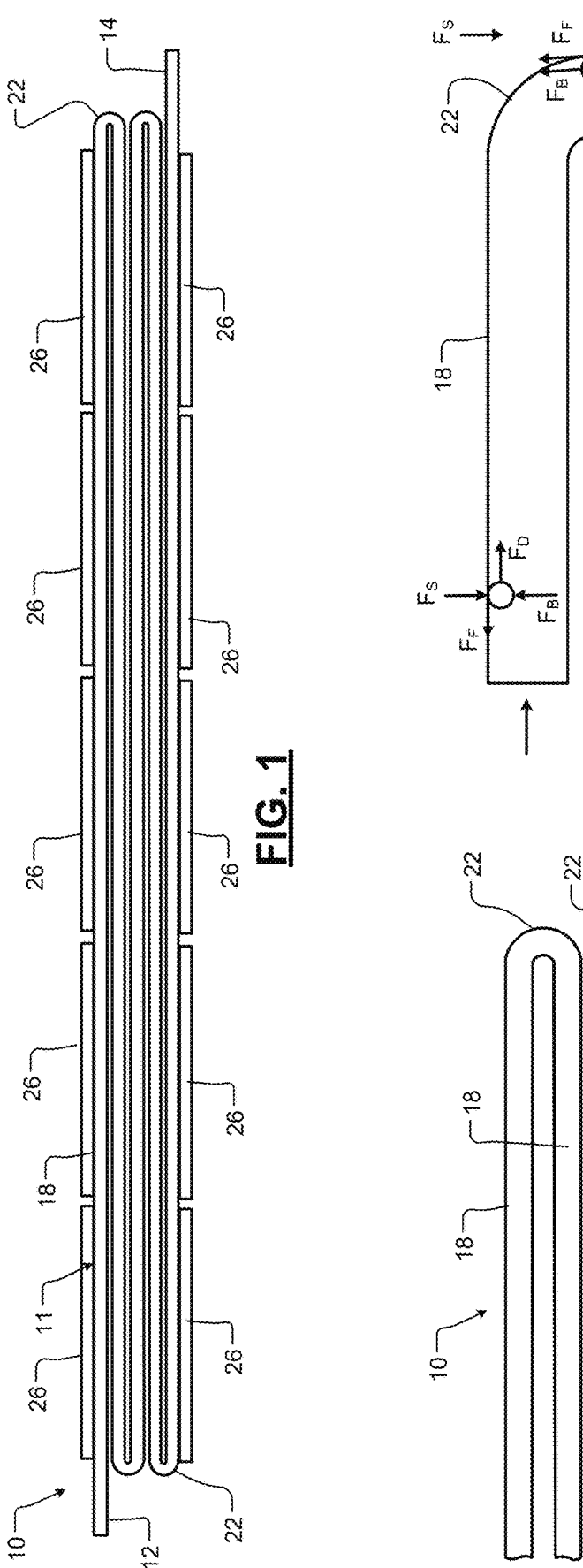
FIG. 1 is a side view of an example of a cooling system including cooling channels arranged between surfaces of battery cells, battery modules, or battery packs of a battery system.
Figure 3:
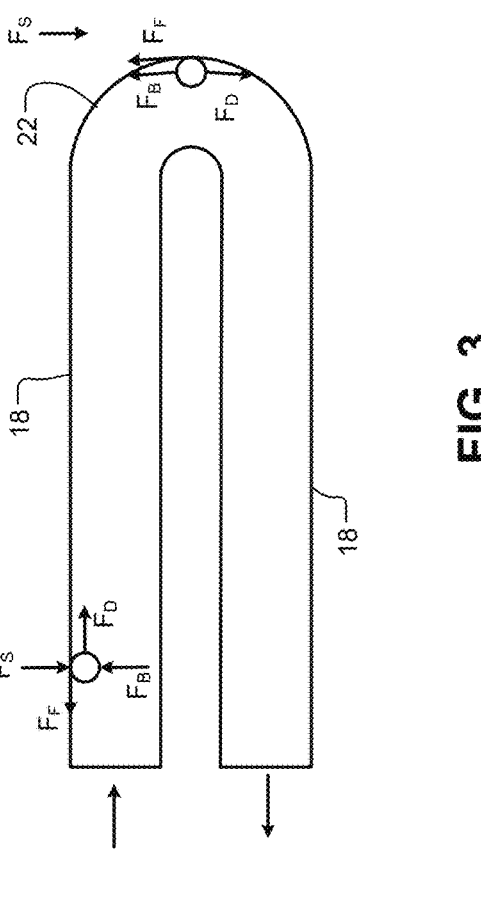
FIG. 3 is an enlarged side view of an example of forces acting on an air pocket in the cooling channel of the cooling system.
Figure 2:
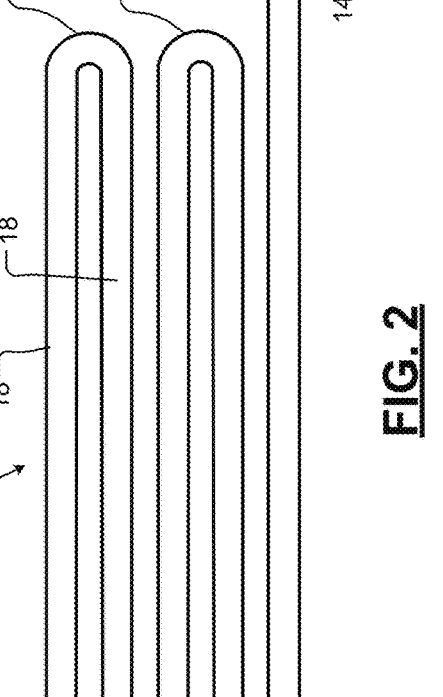
FIG. 2 is an enlarged side view of an example of a cooling system including a cooling channel having a nominal width.

Referring now to FIGS. 1 and 2, a cooling system 10 for a battery system of a hybrid vehicle or an electric vehicle is shown. The cooling system 10 includes a cooling channel 11 including N cooling channel legs 18 that extend longitudinally, where N is an integer greater than one. In some examples, the N cooling channel legs 18 are arranged vertically. The cooling system 10 includes M U-turn locations 22 connecting at least two ends of the N cooling channel legs 18, where M is an integer greater than zero. In some examples, M=N−1. As used herein, U-turn refers to reversal in direction (e.g., in a range from 140° to 220° (e.g., 180°)).

An inlet 12 is located at an end of a first one of the N cooling channel legs 18. An outlet 14 is located at an end of a last one of the N cooling channel legs 18. In some examples, the inlet 12 and the outlet 14 are arranged on opposite sides (or the same side) of the cooling system. Outer surfaces of at least some of the N cooling channel legs 18 are in thermal communication with side surfaces 26 of a battery system (e.g., side surfaces of battery cells, battery modules, and/or battery packs) to remove heat from the battery system.

Referring now to FIG. 2, for large surface cooling systems, accidentally induced air may concentrate in pockets and become trapped at one or more of the M U-turn locations 22 (e.g., airlock) due to the buoyancy effects. The trapped air pockets significantly reduce heat rejection at these locations and increase a pressure drop. Some cooling systems address airlock by increasing a flow rate of the cooling system to ensure adequate channel velocity (usually above 0.5 m/s) to flush trapped air. However, the increased flow rate significantly increases the pressure drop (e.g., 120 kPa@ 20 LPM) and requires a high-power pump, which increases cost and power consumption.

In FIG. 2, various forces are acting on the air bubble including supporting force $F_S$, drag force $F_D$, buoyancy force $F_B$, and frictional force $F_F$ where:

$$F_D = \frac{1}{2}\rho A C_d v^2;$$

$$F_B = \rho V g; \text{ and}$$

$$\text{Critical velocity to flush air pocket} = v_{cr} = K\sqrt{gD}$$

The worst location for the airlock occurs at a midpoint of the M U-turn locations 22 where buoyancy $F_B$ is in the same direction as the frictional force $F_F$.

Figure 4:
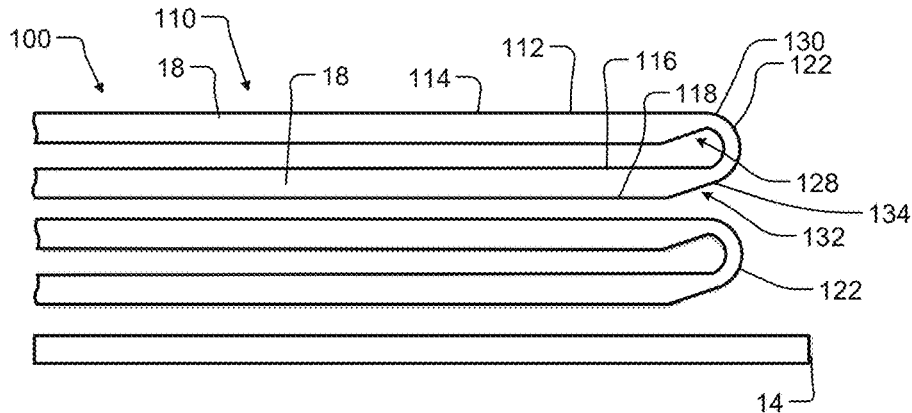
FIG. 4 is a side view of an example of a cooling channel including tapered U-turn locations according to the present disclosure.
Figure 5:
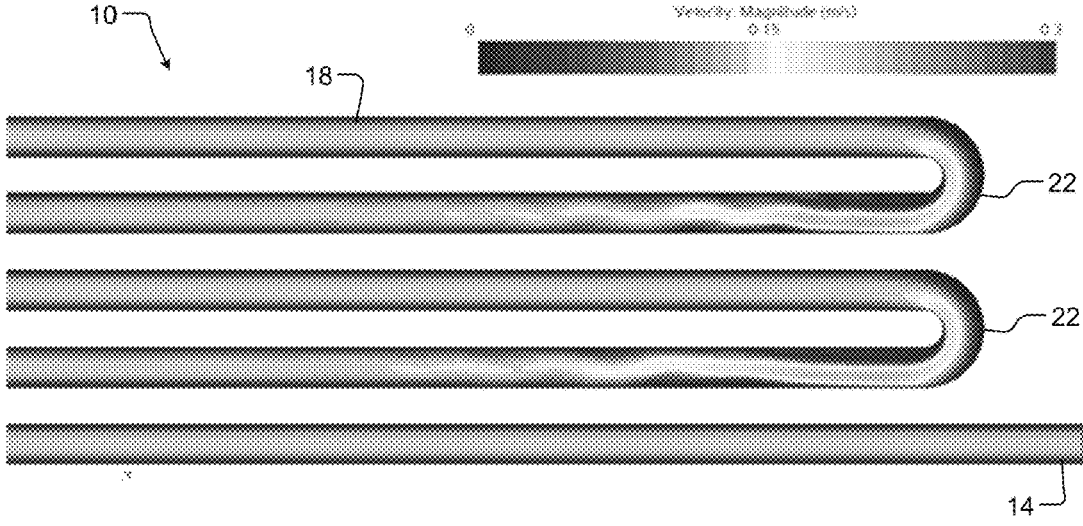
FIGS. 5 and 6 illustrate an example of flow velocity within non-tapered U-turn locations and tapered U-turn locations, respectively, according to the present disclosure.
Figure 6:
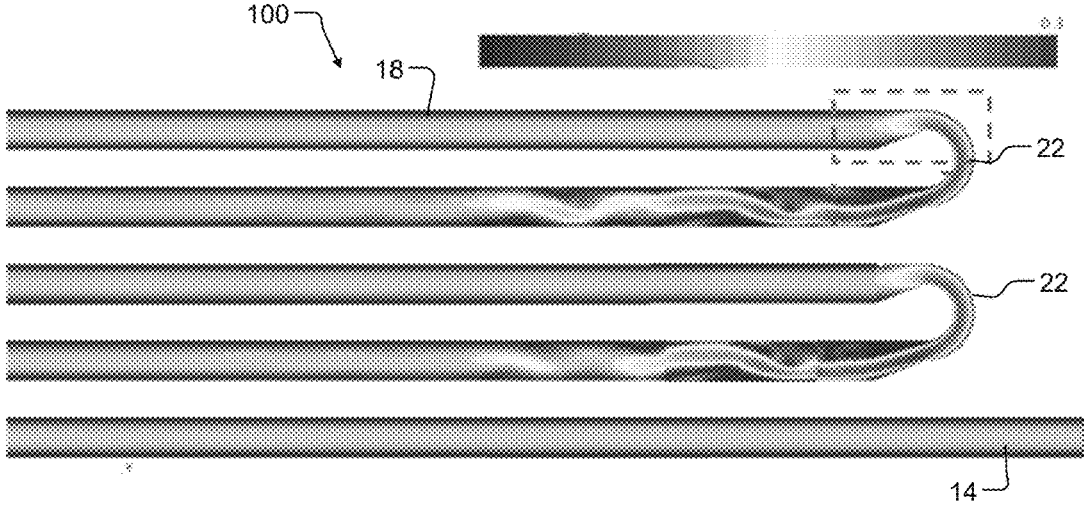

Referring now to FIGS. 4 to 6, a cooling channel with improved performance is shown. At one or more of M U-turn locations 122, the cooling channel 110 is tapered to reduce airlock. More particularly, a bottom side 128 of the M U-turn locations 122 is tapered at an inlet side towards an upper side 130. A bottom side 132 of the M U-turn locations 122 is tapered at an outlet side towards an upper side 134 at the M U-turn locations 122.

Compared to the baseline, channel width at the U-turn locations is reduced. In some examples, the channel width of the M U-turn locations 122 is reduced in a range from 30% to 70% (e.g., 50%) from the nominal width. The tapered U-turn locations increase the local velocity and drag force to facilitate de-aeration at U turns, where the air is most likely to be trapped.

The taper directions are optimized based on computational fluid dynamics (CFD) analysis. The top channel of the U-turn location is tapered along the bottom side to increase upper side velocity to suppress buoyancy. The bottom channel of the U-turn location is also tapered along a bottom side to avoid intensifying the low-pressure vortex at the upper side.

In some examples, the U-turn locations of the cooling channels are manufactured with shape memory alloy to change the shape of the cooling channel at different temperatures. For example, the shape memory alloy constricts above a predetermined temperature corresponding to temperatures where air bubbles are prevalent. For example, copper-aluminum-nickel alloy or nickel-titanium alloy can be used for the U-turn locations or the whole channel.

As can be seen in FIGS. 5 and 6, the U-turn locations of the tapered cooling channel in FIG. 6 have an increased and more uniform velocity as compared to the U-turn locations of the baseline in FIG. 5. As a result, the tapered cooling channel in FIG. 6 efficiently flushes air pockets in the U-turn locations with lower flow rates and pressure drops, which reduces pump load and cost.

Figure 7:
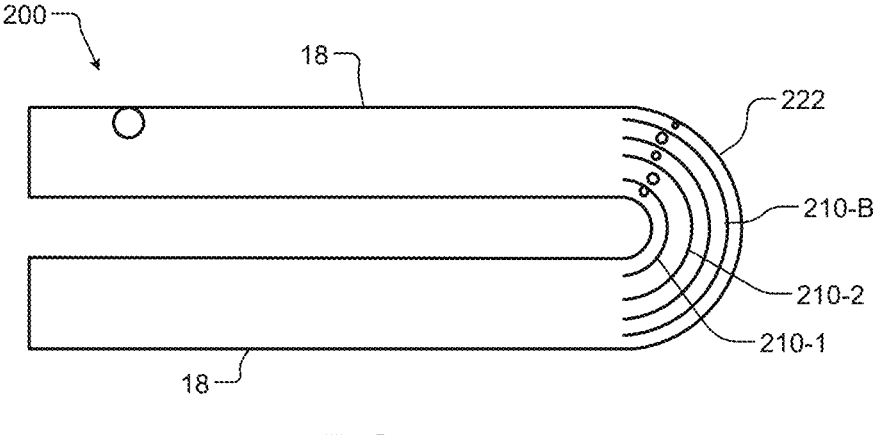
FIG. 7 is a side view of an example of a cooling channel including a one or more annular baffles in the U-turn locations according to the present disclosure.

Referring now to FIG. 7, a cooling channel 200 according to the present disclosure includes arcuate baffles 210-1, 210-2, . . . , and 210-B that are spaced from one another in U-turn locations 222, where B is an integer greater than zero. The arcuate baffles 210 divide the nominal cooling channels into subchannels arranged in a nested configuration to create parallel channels. The arcuate baffles reduce the maximum air pocket sizes to reduce critical velocity for de-aeration. In some examples, the arcuate baffles 210 are spaced uniformly. In other examples, the arcuate baffles 210 have increased spacing from the innermost arcuate baffle to the outermost arcuate baffle. In other examples, the arcuate baffles 210 have decreased spacing from the innermost arcuate baffle to the outermost arcuate baffle. As can be appreciated, the arcuate baffles can be used with or without tapering described above.

Figure 8:
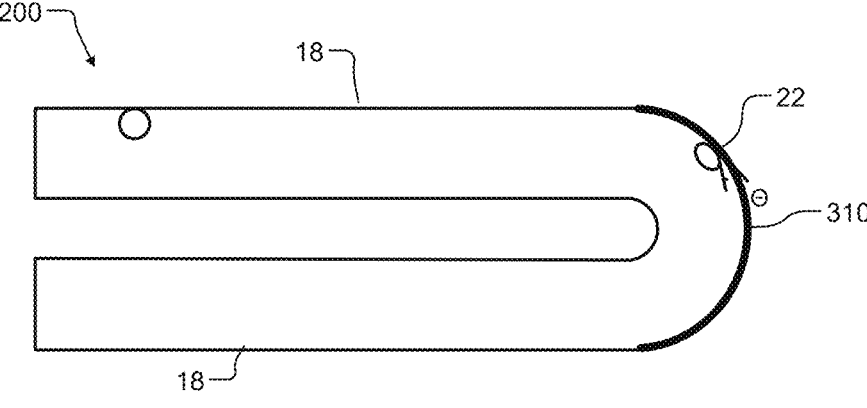
FIG. 8 is a side view of an example of a cooling channel including a surface treatment film at the U-turn locations according to the present disclosure.

Referring now to FIG. 8, an inner surface of the U-turn locations is coated with a surface treatment film to reduce a coolant-wall contact angle Θ. The surface treatment film reduces frictional force to facilitate de-aeration. As can be appreciated, the surface treatment film can be used with or without arcuate baffles and/or tapering described above. In some examples, the surface treatment comprises a hydrophobic coating material such as manganese oxide polystyrene.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A cooling system comprising:
a cooling channel having a nominal width;
N longitudinal portions of the cooling channel, where N is an integer greater than one;
an inlet connected to an end of a first one of the N longitudinal portions of the cooling channel;
an outlet connected to an end of a last one of the N longitudinal portions of the cooling channel; and
at least one U-turn location within the cooling channel connecting ends of at least two middle ones of the N longitudinal portions of the cooling channel,
wherein the cooling channel at the at least one U-turn location is tapered such that the cooling channel includes a reduced channel width at the at least one U-turn location relative to the nominal width,
wherein the N longitudinal portions of the cooling channel are arranged over one another in a vertical direction, wherein the cooling channel includes an upper cooling channel, and wherein only a bottom side of the upper cooling channel at the at least one U-turn location is tapered such that the reduced channel width of the upper cooling channel progressively narrows towards an upper side of the upper cooling channel at the at least one U-turn location,
wherein the cooling channel includes a lower cooling channel, and wherein only a bottom side of the lower cooling channel at the at least one U-turn location is tapered such that the reduced channel width of the lower cooling channel progressively narrows towards an upper side of the lower cooling channel at the at least one U-turn location.

2. The cooling system of claim 1, wherein the cooling channel is tapered at the at least one U-turn location in a range from 30% to 70% from the nominal width.

3. The cooling system of claim 1, further comprising B annular baffles arranged in the at least one U-turn location, where B is an integer greater than zero, wherein the B annular baffles divide the cooling channel into subchannels arranged in a nested configuration of parallel channels.

4. The cooling system of claim 3, wherein B is greater than one and the B annular baffles are uniformly spaced.

5. The cooling system of claim 3, wherein B is greater than two and the B annular baffles are spaced by an increasing width from an innermost to an outermost of the B annular baffles.

6. The cooling system of claim 1, further comprising a surface treatment film coated on an inner surface of the at least one U-turn location, wherein the surface treatment film is configured to reduce a coolant-wall contact angle of the cooling channel at the at least one U-turn location from the nominal width.

7. The cooling system of claim 1, wherein the at least one U-turn location comprises a shape memory alloy.

8. A vehicle comprising:
a battery system; and
the cooling system of claim 1 in thermal contact with one or more surfaces of the battery system.

9. A cooling system comprising:
a cooling channel having a nominal width;
N longitudinal portions of the cooling channel extending longitudinally, where N is an integer greater than one;
an inlet connected to an end of a first one of the N longitudinal portions of the cooling channel;
an outlet connected to an end of a last one of the N longitudinal portions of the cooling channel;
at least one U-turn location within the cooling channel connecting ends of at least two middle ones of the N longitudinal portions of the cooling channel; and
B annular baffles arranged in within the cooling channel at the at least one U-turn location where B is an integer greater than zero, wherein the B annular baffles divide the cooling channel at the at least one U-turn location into subchannels arranged in a nested configuration of parallel channels,
wherein the cooling channel includes an upper cooling channel and a lower cooling channel,
wherein only a bottom side of the upper cooling channel at the at least one U-turn location is tapered towards an upper side of the upper cooling channel at the at least one U-turn location to provide a reduced channel width that progressively narrows from the bottom side toward the upper side of the upper cooling channel,
wherein only a bottom side of the lower cooling channel at the at least one U-turn location is tapered towards an upper side of the lower cooling channel at the at least one U-turn location to provide a reduced channel width that progressively narrows from the bottom side toward the upper side of the lower cooling channel.

10. The cooling system of claim 9, wherein B is greater than one and the B annular baffles are uniformly spaced.

11. The cooling system of claim 9, wherein B is greater than two and the B annular baffles are spaced by an increasing width.

12. The cooling system of claim 9, wherein the N longitudinal portions of the cooling channel are arranged over one another in a vertical direction.

13. The cooling system of claim 9, wherein the cooling channel at the at least one U-turn location includes a reduced channel width that is tapered in a range from 30% to 70% from the nominal width.

14. The cooling system of claim 13, wherein the at least one U-turn location comprises a shape memory alloy.

15. The cooling system of claim 9, further comprising a surface treatment film coated on an inner surface of the at least one U-turn location, wherein the surface treatment film is configured to reduce a coolant-wall contact angle of the cooling channel at the at least one U-turn location from the nominal width.

16. A cooling system comprising:

a cooling channel having a nominal width;

N longitudinal portions of the cooling channel, where N is an integer greater than one;

an inlet connected to an end of a first one of the N longitudinal portions of the cooling channel;

an outlet connected to an end of a last one of the N longitudinal portions of the cooling channel; and at least one U-turn location connecting ends of at least two middle ones of the N longitudinal portions of the cooling channel, wherein only a bottom side of an upper cooling channel of the cooling channel at the at least one U-turn location is tapered towards an upper side of the upper cooling channel at the at least one U-turn location, wherein only a bottom side of a lower cooling channel of the cooling channel at the at least one U-turn location is tapered towards an upper side of the lower cooling channel at the at least one U-turn location, and wherein a cross-sectional area of the cooling channel at the at least one U-turn location progressively decreases from the bottom side to the upper side of the upper cooling channel and from the bottom side to the upper side of the lower cooling channel such that the cooling channel is tapered at the at least one U-turn location in a range from 30% to 70% from the nominal width.

* * * * *